United States Patent [19]
Ruth

[11] 3,884,189
[45] May 20, 1975

[54] MULTIPLE COMPARTMENT ANIMAL FEEDER

[76] Inventor: Arthur P. Ruth, P.O. Box 11037, Houston, Tex.

[22] Filed: July 13, 1973

[21] Appl. No.: 378,955

[52] U.S. Cl. .......................................... 119/51.13
[51] Int. Cl. ............................................ A01k 05/02
[58] Field of Search........... 119/51.11, 51.12, 51.13, 119/54, 56; 222/504, 506

[56] References Cited
UNITED STATES PATENTS

| 1,307,120 | 6/1919 | Dunham | 119/54 |
|---|---|---|---|
| 2,585,371 | 2/1952 | Coffing | 119/51.13 X |
| 3,452,716 | 7/1969 | Molimard | 119/56 |

FOREIGN PATENTS OR APPLICATIONS

| 24,554 | 5/1919 | Denmark |
|---|---|---|
| 206,577 | 11/1923 | United Kingdom |

Primary Examiner—Hugh R. Chamblee
Attorney, Agent, or Firm—Donald Gunn

[57] ABSTRACT

An animal feeder which includes a plurality of compartments each adapted to receive a quantity of animal feed therein, the compartments being aligned and having a bottom door which opens to dispense the animal feed. A common timer mechanism is used for all of the compartments wherein a motor through an appropriate gear box rotates an elongate shaft. The shaft has a cam adjacent to each compartment. The cams are adjusted relative to one another to move to an operative position forcing open the door of each compartment. Each door is held closed by a latch mechanism on the opposite side from the hinge and a projecting tab on the door extends to a point where it is moved downwardly by the cam, thereby opening the door when it breaks away from the latch mechanism.

8 Claims, 8 Drawing Figures

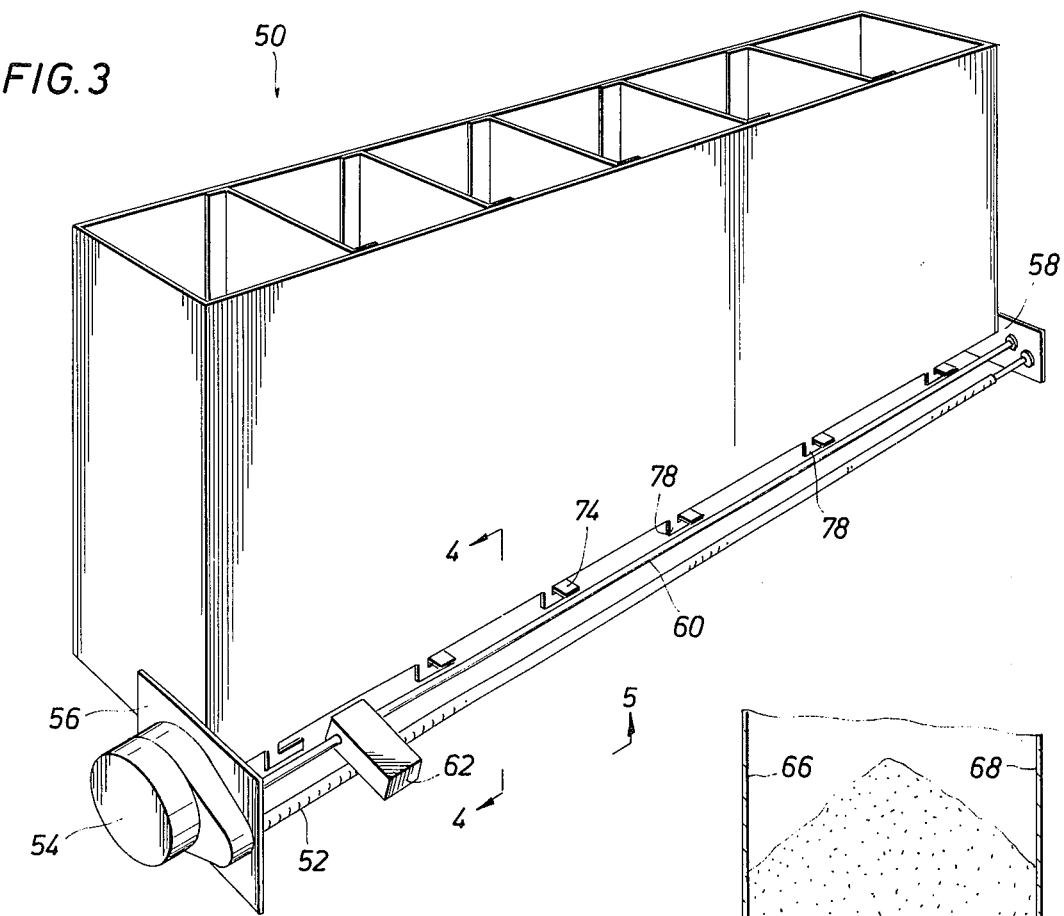
FIG. 3
FIG. 4
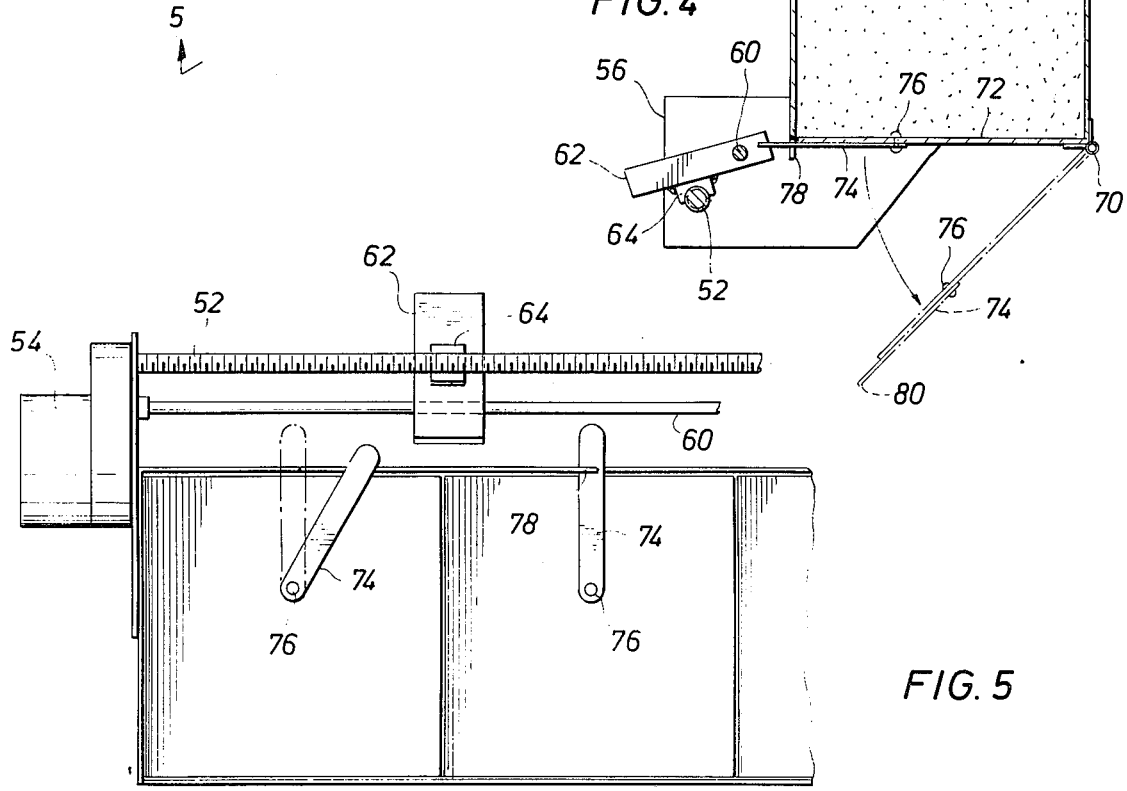
FIG. 5

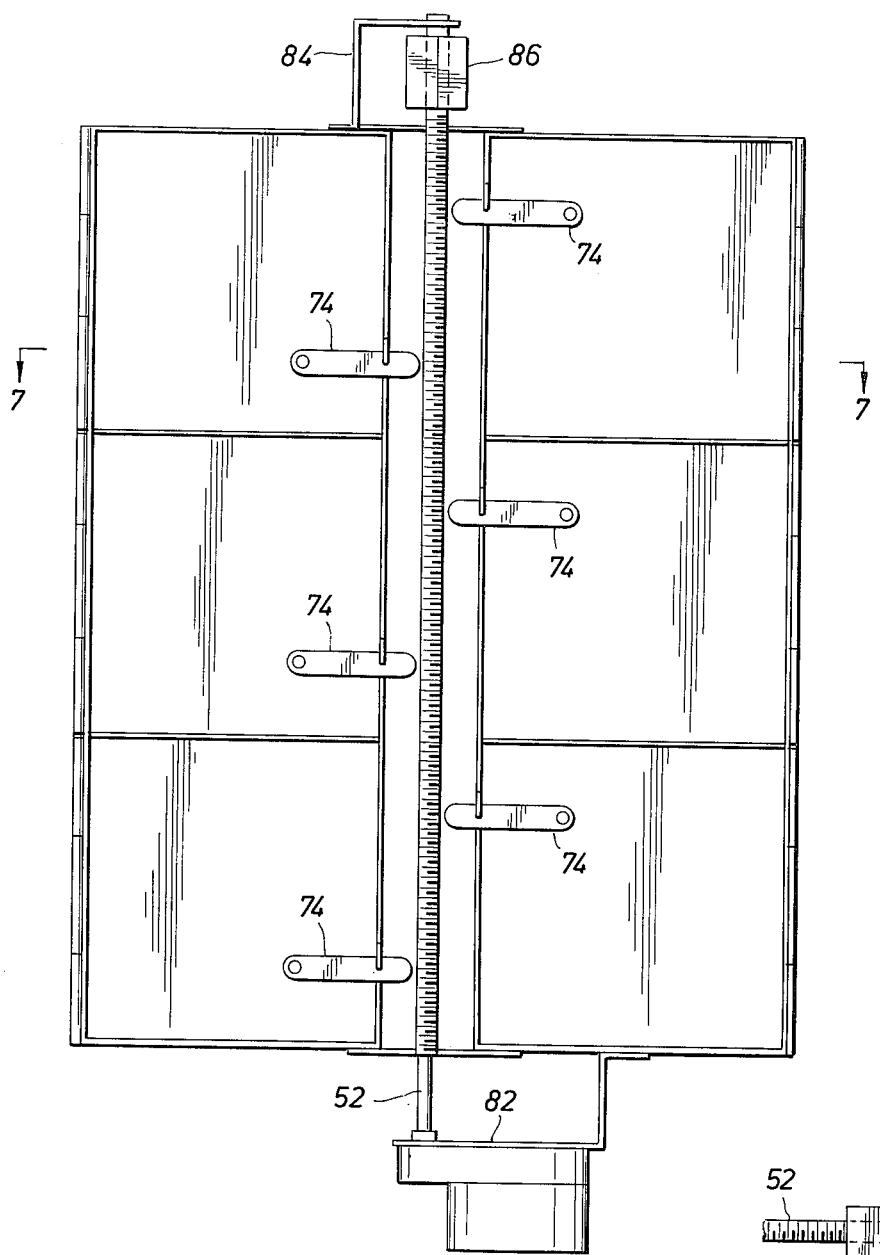
FIG. 6
FIG. 8
FIG. 7
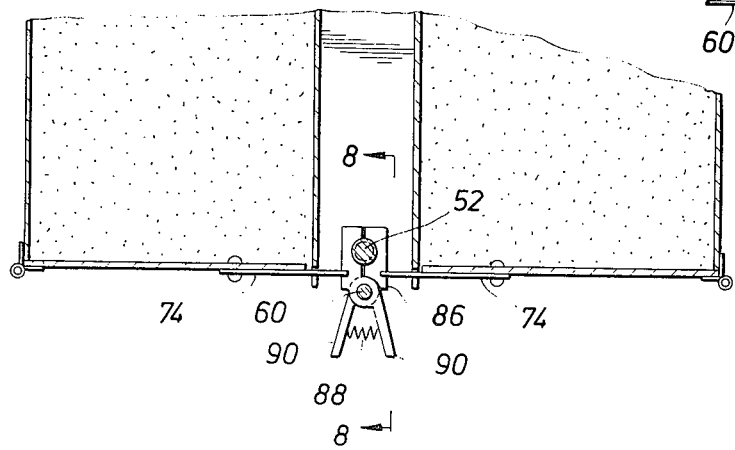

MULTIPLE COMPARTMENT ANIMAL FEEDER

BACKGROUND OF THE INVENTION

In the raising of pets and horses for pleasure, it is necessary to leave them untended for a period of time. Quite often, an individual will own a horse which is stabled away from his residence so that the animal must fend for itself for a period of time until the owner comes again. The present invention is intended to provide an apparatus which periodically feeds an animal in such circumstances. The present invention is particularly adapted for use by a home owner with pets who will occasionally take a trip and be away from his residence for a few days. The present invention describes a feeder which is adapted to receive and store a quantity of food for such a pet and dispense the food on a periodic basis. The food which is dispensed is delivered in measured quantities so that the pet will not be overfed. Moreover, the food is dispensed on a regular schedule so that the pet will learn to rely on feeding at an expected interval.

SUMMARY OF THE INVENTION

The present invention is summarized as a generally rectangular storage bin which is divided into a number of compartments by transverse partitions. The storage bins thus define several compartments which are open at the top enabling them to be filled. Each compartment is closed at the bottom by a door which is hinge mounted along one edge and which is held closed by a latch mechanism on the opposite edge. The latch mechanism latches on movement of the door to the closed position. Each door includes a protruding or projecting tab. The tab extends to the vicinity of a cam mounted on a common cam shaft. A single motive source such as an electric motor rotates the cam shaft and thereby rotates all of the cams. Each cam carries a lobe which strikes the protruding tab carried on the door and forces open the door, breaking it free of the latch mechanism. The door then drops open and all the food which is in the compartment above the door is dispensed for feeding purposes. The cams can be adjusted to control the interval and which feed is dispensed.

An alternative embodiment is further disclosed which utilizes a lead screw having a travelling nut which moves along its length and which nut actuates or trips latch mechanisms of the storage bins along the length. This arrangement enables the travelling nut to open bins on both sides of the lead screw. The travelling nut is threaded on its bottom side to enable it to be lifted from the screw and reset. In another form, the travelling nut is preferably split and spring loaded so that the two halves are forced together about the screw. The lead screw is parallel to a guide shaft and the nut travels therealong.

BRIEF DESCRIPTION OF THE DRAWINGS

FIG. 3 is an isometric view of the present invention illustrating an alternative embodiment where the several compartments are open by a nut on a lead screw which nut actuates cams or latch mechanisms protruding into its path;

FIG. 4 is a sectional view along the line 4—4 of FIG. 3 showing details of construction of the lead screw and travelling nut and the cam and latch mechanism which cooperate with them;

FIG. 5 is a bottom view of the apparatus showing the latch mechanism in operation;

FIG. 6 is a third embodiment shown in plan view where compartments are located on both sides of a lead screw similar to the lead screw shown in FIG. 3;

FIG. 7 is a sectional view along the line 7—7 of FIG. 6 showing the arrangement of the travelling nut on the lead screw; and FIG. 8 is a sectional view along the line 8—8 of FIG. 7 shown details of construction of a split travelling nut.

DESCRIPTION OF THE PREFERRED EMBODIMENT

Figure 1:
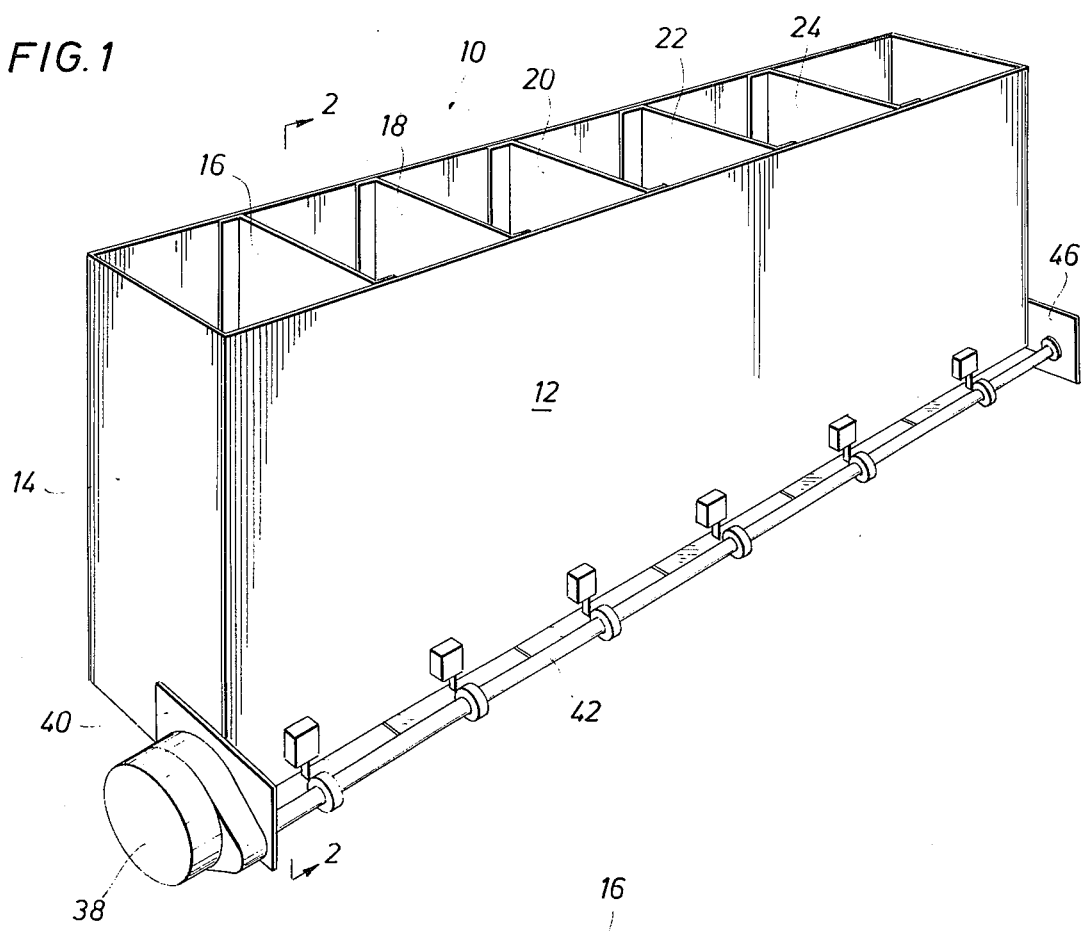
FIG. 1 is an isometric view of the present invention illustrating the arrangement of the several compartments with the cam and cam shaft mechanism for opening the various compartments in timed sequence; and, FIG. 2 is a sectional view taken along the line 2—2 of FIG. 1 illustrating details of construction of the timer mechanism which opens the compartments in timed sequence.

Attention is first directed to FIG. 1 of the drawings where the numeral 10 identifies the multicompartment food container of the present invention. In FIG. 1, an elongate structure is shown having a front wall 12 and an end wall 14. They are matched by parallel walls to thereby define an upright open top rectangular structure. The rectangular structure which comprises a storage container for the food includes transverse partition 16, 18, 20, 22 and 24. These partitions divide the structure into a multiplicity of compartments. Thus, the illustrated embodiment includes six compartments. The number may be varied upwardly or downwardly depending on the charges of animal feed to be dispensed. Preferably, the compartments are all of the same size. The compartments are preferably all filled from the top and to this end, the top of each compartment is left open. The open top compartments all receive animal feed from the top, the measure to be determined by the owner and will store the animal feed until the animal feed has been dispensed.

The apparatus is shown without a top or cover. Preferably, a movable top is placed over the structure to prevent rain from melting the feed and perhaps fusing it together into a solid mass or otherwise damaging the shape and characteristic texture of the feed. In the alternative, the device of the present invention can be installed in a building.

Figure 2:
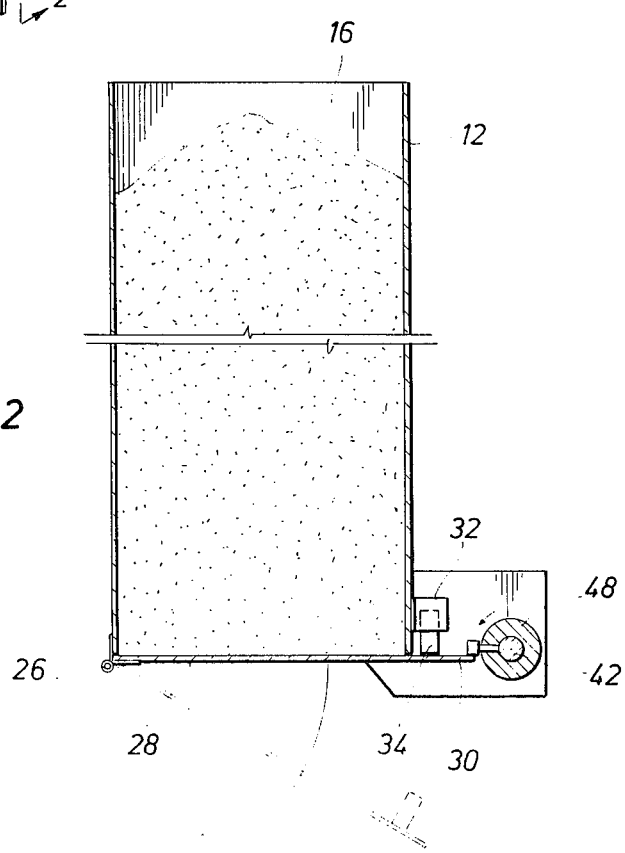

Attention is next directed to FIG. 2 of the drawings where a single compartment is illustrated in sectional view. The numeral 26 identifies a hinge along one side of the compartment. The hinge 26 is attached to a door 28. The door mechanism 28 is sufficiently large to close the bottom of the entire compartment thereabove. Moreover, the door extends beyond the front wall and thereby defines a projecting tab which is indicated by the numeral 30. The tab 30 is the extra margin of size of the door 28 extending beyond the front.

Each compartment is equipped with a latch mechanism. In FIG. 2, the numeral 32 identifies a fixed latch holder. The numeral 34 identifies a projecting cooperative component which is attached to the door mechanism 28. By way of example, kitchen cabinet latch mechanisms can be used with the present invention. One version utilizes a pair of pinch rollers which clasp a protruding tongue which is placed between the pinch rollers when the door is closed. In any case, the cooperative component is attached to the projecting tab 30 of the door 28.

Returning to FIG. 1, the numeral 38 identifies a housing which is joined to a mounting plate 40 which is adapted to be joined by tack welding or bolts to the end of the structure as illustrated in FIG. 1. The housing 38 receives a suitable electric motor and gear box. The motor and gear box in the housing drives an elongate cam shaft 42. The shaft 42 extends from the mounting plate 40 to a similar mounting plate 46 at the opposite end of the equipment. The two mounting plates are preferably parallel. They support the cam shaft in a position parallel to and adjacent to the projecting tabs on each of the compartments.

Referring again to FIG. 2, it will be observed that the cam shaft 42 supports a cam lobe 48. The cam lobe is positioned immediately adjacent to the projecting tab 30 of the door 28. The cam lobe in the preferred embodiment is formed of a set screw which fixes the cam lobe to the shaft 48. The set screw protrudes at an angle so as to strike the projecting tab when it is rotated against the tab. As viewed in FIG. 2, the shaft 42 rotates in a counterclockwise direction. The lobe illustrated in FIG. 2 is adjusted differently from the lobes located elsewhere on the shaft 42. Thus, each lobe is located so that it opens its respective compartment at a different point in time. More particularly, the cam lobes are arranged so that the food is dispensed in accordance with a predetermined interval. For instance, the interval might be 12 hours. In this case, the six compartments will then enable feeding of an animal over a 72 hours period. To this end, the cam shaft 42 preferably makes one rotation in three days and the individual lobes are arranged at one-sixth of a revolution from one another. As a consequence, the multiplicity cams cause the various compartments to be discharged once every 12 hours. Of course, different timing arrangements can be used. For instance, if one wants to dispense animal feed on a daily basis, then the six compartments will dispense the feed over a 6 day period. To this end, the shaft 42 must rotate at a slower rate.

In operation, the device of the present invention is preferably loaded with food. Food is placed in each compartment. After the food has been placed in the several compartments, the electric motor which operates the equipment is started. After the electric motor starts, the shaft 42 is rotated by the motor. Eventually, one of the compartments will be discharged by operation in the following manner. Referring to FIG. 2 of the drawings, the cam lobe 48 rotates to bring the head of the set screw in near proximity of the projecting tab. The tab is struck and forced downwardly, freeing the tab of the latch mechanism and thereby opening the door. The door 28 swings along the hinge 26 and dumps the animal feed which is placed therein below the compartment. The cam shaft 42 continues to rotate and subsequently at a specified interval, an additional compartment is discharged by operation in the same manner.

The apparatus can be refilled by turning off the motor and restoring the doors to the latch mechanism so that the latch mechanism will hold the doors shut. Then, food can be placed in each compartment resting on the doors.

Attention is next directed to FIG. 3 of the drawings where the numeral 50 indicates a second alternative embodiment of the present invention. The embodiment 50 uses an arrangement of compartments which is preferably similar or identical in FIG. 1. That is to say, similar compartments of similar size and capacity are arranged in like manner. More importantly, the embodiment of FIG. 3 is similar in the inclusion of a motor which drives a lead screw 52 through an appropriate gear box 54. The lead screw extends from a mounting plate 56 to a similar mounting plate 58 at the opposite end. It is preferably supported by bearings to enable it to rotate freely. The lead screw includes threads along the major portion of its length but is preferably without threads at the far end as illustrated in FIG. 3. The lead screw 52 is parallel to a guide shaft 60 which extends between the same brackets. These two members carry a travelling nut 62 as will be described.

As shown in FIG. 4 of the drawings, the travelling nut 62 is drilled and received about the guide shaft 60. The passage is off center so that the bulk of the weight of the travelling nut 62 is on one side. This weight is supported by means of a block 64 which is preferably welded on the lower side of the travelling nut 62. The block 64 has a set of threads, or more accurately, one-half of a set of threads, formed in a semi-circular face. The threads on the block 64 engage and mate with the threads on the lead screw 52. That is to say, the nut 62 does not fully surround the lead screw but it has threads engaged with threads of the screw in sufficient number to cause the nut 62 to traverse the lead screw 52. Travel of the nut 62 is limited at the extreme end where the threads terminate on the lead screw as illustrated in FIG. 3 of the drawings.

FIG. 4 depicts one of the compartments but they are all similar and function in a similar manner. FIG. 4 illustrates a storage compartment which is defined by a front wall 66 and a back wall 68. The back wall 68 supports a hinge 70 at its bottom edge. The hinge 70 supports a bottom door 72 which swings about the hinge 70. The bottom door is latched in the up position by means of a protruding latch 74 which is joined to the bottom at a rivet or bolt 76. The latch 74 swings about the bolt 76. That is to say, FIG. 5 illustrates it rotating about the bolt 76. An L-shaped tab 78 (see FIG. 3) catches the latch 74. The latch 74 extends through the catch 78 and therebeyond to the pathway of the travelling nut 62. That is to say, the outer end waits in the path of the travelling nut which moves along the screw 52.

The outer end of the latch will be designated by the numeral 80 and will be defined hereinafter as a cam to conform to the terminology adopted for the first embodiment.

Attention is next directed to FIG. 5 of the drawings which is a bottom view and which particularly illustrates movement of the latch mechanism 74 from a position for interception by the travelling nut 62 to an alternative position where it has been deflected to the side. When it is moved to the side, the latch 74 is freed of the catch 78, enabling the bottom 72 to pivot about the hinge 70, thereby dumping the contents of the container above the bottom. Moreover, FIG. 5 of the drawings illustrates how the travelling nut 62 is carried on the guide 60 and moves adjacent to the lead screw 52. The travelling nut, of course, rest on the screw 52 and travels along its length at a speed determined by the pitch of the screw and the rate or speed of the motor which drives it. As shown in FIG. 3, the travelling nut 62 travels past multiple compartments and operate the same mechanism as described and shown in FIGS. 4 and 5 so that all of the compartments can be sequentially opened in timed sequence.

Attention is next directed to FIG. 6 of the drawings which shows an alternative embodiment wherein the compartments are located on both sides of the lead screw. The lead screw again is indicated by the numeral 52 and extends from a bracket 82 to a similar bracket 84 at the opposite end. Compartments are arranged on both sides of the lead screw. More specifically, the bottom view of FIG. 6 shows the various cam mechanisms staggered so that they will open the containers at specified, regular intervals. In sum and in substance, the embodiment of FIG. 6 is approximately one-half as long while yet providing compartments of equal number and storage capacity. The latch mechanisms 74 are staggered so that they are operated at the same relative time intervals as the embodiments shown at 50. To this end, the motor can be operated at approximately one-half the speed or the pitch of the screw can be reduced by a factor of two.

The embodiment of FIG. 6 thus differs in the arrangement of the various storage containers or compartments and the positioning of the motor and the mounting brackets at the ends of the lead screw. In FIG. 7, the lead screw is positioned above the guide rod 60. The guide rod 60 serves as a pivot for a split travelling nut 86. The travelling nut 86 is split, having two halves which face one another which, when considered together, have a centrally drilled passage which is threaded to engage the threads on the lead screw. The pitch and thread preferably match that found on the lead screw. The two halves of the travelling nut are forced together by a spring 88 which is positioned between protruding similar tabs 90, one being attached to each half of the split nut. Each tab includes a cylindrical hollow portion which is positioned about the guide rod 60.

FIG. 8 shows additional details of the travelling nut. The travelling nut pivots on the guide rod 60. Each half is pivotally mounted on it. The two halves are forced together by the spring 88. The two halves of the nut are brought together about the lead screw 52. They are forced together in a manner which enables them to clamp the lead screw and remain engaged with it as the travelling nut traverses the equipment.

The embodiments of FIGS. 3 and 6 are both reset by returning the travelling nut to one end of the screw after it is traversed to the other end. With regard to the embodiment of FIG. 3, the travelling nut 62 is simply lifted and pivoted about the guide shaft. This disengages the threads from the lead screw and enables it to slide back to the originating position. The travelling nut shown in FIG. 6 is returned to its beginning position by finger engagement of the projecting tabs 90 and compression of the spring 88. This splits the nut along the illustrated line and disengages both halves from the lead screw 52. The travelling nut is then moved along the guide shaft 60 to its originating position. When released, the spring causes the two halves to reengage the lead screw 52. The containers or compartments for storage of the animal feed are likewise reset easily. That is to say, the bottom is swung about the hinge to a generally horizontal position and the protruding latch mechanism is pivoted to engage the catch 78. This leaves the cam portion protruding in the path of the lead screw and travelling nut to enable the device to be subsequently used.

The number of compartments can be expanded or reduced. Moreover, the size of the compartments can be enlarged by a variation of any of the three dimensions.

The foregoing is intended as a description of the preferred embodiment, but the scope hereof is determined by the claims which are appended hereto.

What is claimed is:

1. An animal feeder having a multiplicity of compartments for dispensing animal feed to an animal over a series of timed intervals which comprises:

a storage container divided into at least two compartments by partitions, said storage container being adapted to receive and store food placed therein and further including a hinged door at the bottom of each compartment;

latch means for holding the door at each compartment in a closed position;

a lead screw operatively arranged adjacent to said storage container;

a travelling nut threadedly engaged with said lead screw;

a projecting means associated with each door and operatively arranged relative to said latch means for opening said door; and, motive means for operating said lead screw.

2. The apparatus of claim 1 wherein said travelling nut is supported by a guide rod parallel to said lead screw and said projecting means is positioned in the path of said travelling nut to be operated thereby.

3. The apparatus of claim 1 wherein said travelling nut is a split nut, having two portions which are urged by a resilient means toward one another and which can be engaged and disengaged on hand manipulation overcoming said resilient means.

4. The apparatus of claim 1 wherein said storage container includes compartments on both sides of said lead screw and said compartments each include a door and a respective latch means therefor, and said projecting means for said compartments are arranged along the length of said lead screw at spaced locations thereof.

5. The apparatus of claim 1 wherein said travelling nut is rested on the top side of said lead screw and does not fully encircle said lead screw to enable it to be raised and lowered into and out of engagement with said lead screw, and is additionally supported on a parallel guide means.

6. The apparatus of claim 1 wherein said latch means includes a projecting latch pivotly mounted to said door, and said latch means is held in a closed position by means of a catch mechanism, said travelling nut cooperating with said projecting means to disengage said latch mechanism from said catch mechanism.

7. The apparatus of claim 1 wherein said lead screw has threads along a specified portion thereof and no threads immediately adjacent to the end thereof.

8. The invention of claim 1 including a hinge along an edge of said door opposite said tab.

* * * * *